United States Patent
Kotagiri et al.

(10) Patent No.: US 9,249,993 B2
(45) Date of Patent: Feb. 2, 2016

(54) SUPPORT SYSTEM AND METHOD FOR TROUGH-SHAPED SOLAR ENERGY CONCENTRATIONS

(75) Inventors: Vikas Kotagiri, Troy, MI (US); Mark F. Werner, LaSalle (CA); Michael J. Devor, Bloomfield, MI (US); Kevin R. Langworthy, Holly, MI (US); Gianfranco Gabbianelli, Birmingham, MI (US)

(73) Assignee: Magna International Inc., Aurora, Ontario (CA)

( * ) Notice: Subject to any disclaimer, the term of this patent is extended or adjusted under 35 U.S.C. 154(b) by 92 days.

(21) Appl. No.: 13/883,327

(22) PCT Filed: Nov. 3, 2011

(86) PCT No.: PCT/CA2011/001232
§ 371 (c)(1),
(2), (4) Date: May 8, 2013

(87) PCT Pub. No.: WO2012/058765
PCT Pub. Date: May 10, 2012

(65) Prior Publication Data
US 2013/0240463 A1     Sep. 19, 2013

Related U.S. Application Data

(60) Provisional application No. 61/410,159, filed on Nov. 4, 2010, provisional application No. 61/430,681, filed on Jan. 7, 2011.

(51) Int. Cl.
*A47F 7/00*     (2006.01)
*F24J 2/52*     (2006.01)
(Continued)

(52) U.S. Cl.
CPC     *F24J 2/5203* (2013.01); *F24J 2/14* (2013.01); *F24J 2/5233* (2013.01); *G02B 7/183* (2013.01); *Y02E 10/45* (2013.01); *Y02E 10/47* (2013.01); *Y10T 29/49826* (2015.01)

(58) Field of Classification Search
CPC ........... F24J 2/14; F24J 2/5403; F24J 2/5233; F24J 2002/5482; F24J 2/5203; Y10T 29/49826; Y10T 29/49947; Y02E 10/45; Y02E 10/47; G02B 7/183
USPC .......... 52/639, 640, 81.3; 211/13.1, 175, 189, 211/183
See application file for complete search history.

(56) References Cited

U.S. PATENT DOCUMENTS 1,911,018 A * 5/1933 Goeltz .................. 52/648.1
2,278,797 A * 4/1942 Raymond .................. 52/89
(Continued)

FOREIGN PATENT DOCUMENTS

EP     1947403 A1     7/2008
ES     1070880 U     11/2009
(Continued)

*Primary Examiner* — Korie H Chan
(74) *Attorney, Agent, or Firm* — Dickinson Wright PLLC

(57) ABSTRACT

A support system for a trough-shaped solar collector assembly includes a support arm comprising first and second curved rails and an interconnecting web structure. The web structure is secured along first and second opposite edges thereof to first and second web engaging structures, which are provided along facing surfaces of the first and second rails, respectively. Prior to fixedly securing the web structure to the web engaging structure of the first and second curved rails, the location and/or the orientation of the web structure are adjustable for supporting interconnection of the first and second curved rails with different rates of convergence between the first and second curved rails. The support arm further includes a plurality of mirror-attachment brackets coupled to the first rail for attaching the trough-shaped solar collector assembly to the support arm and structure attachment brackets for mounting the support arm to a structure.

19 Claims, 9 Drawing Sheets

(51) Int. Cl.
  *G02B 7/183* (2006.01)
  *F24J 2/14* (2006.01)

(56) References Cited

U.S. PATENT DOCUMENTS

| | | | | |
|---|---|---|---|---|
| 2,828,756 | A | * | 4/1958 | Worley .......................... 135/97 |
| 4,078,352 | A | * | 3/1978 | Knowles ........................ 52/693 |
| 4,089,148 | A | * | 5/1978 | Oehmsen et al. ............... 52/693 |
| 4,308,703 | A | * | 1/1982 | Knowles ........................ 52/694 |
| 4,423,719 | A | | 1/1984 | Hutchison |
| 4,665,677 | A | * | 5/1987 | Palacio et al. .................. 52/693 |
| D297,864 | S | * | 9/1988 | Funk ............................. D25/61 |
| D352,557 | S | * | 11/1994 | Hing .............................. D25/61 |
| 5,433,055 | A | * | 7/1995 | Schliep ......................... 52/694 |
| 5,865,008 | A | * | 2/1999 | Larson .......................... 52/690 |
| 7,143,550 | B1 | * | 12/2006 | Lopez ........................... 52/81.3 |
| 7,409,804 | B2 | * | 8/2008 | Moody et al. .................. 52/639 |
| D601,718 | S | * | 10/2009 | Chang ........................... D25/61 |
| D705,450 | S | * | 5/2014 | Landry .......................... D25/62 |
| 2008/0141612 | A1 | | 6/2008 | Schierding |
| 2008/0204352 | A1 | | 8/2008 | Reynolds et al. |
| 2009/0194657 | A1 | * | 8/2009 | Vazquez Ingelmo et al. ......................... 248/309.1 |
| 2010/0208375 | A1 | * | 8/2010 | Albisu Tristan et al. ..... 359/867 |
| 2011/0000479 | A1 | * | 1/2011 | Gonzalez Moreno ........ 126/694 |

FOREIGN PATENT DOCUMENTS

| | | |
|---|---|---|
| WO | 9849409 A1 | 11/1998 |
| WO | 2010024891 A1 | 3/2010 |
| WO | 2010120349 A1 | 10/2010 |
| WO | 2011118754 A1 | 9/2011 |

\* cited by examiner

PRIOR ART      FIG.1

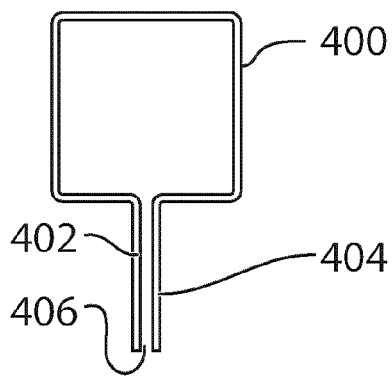
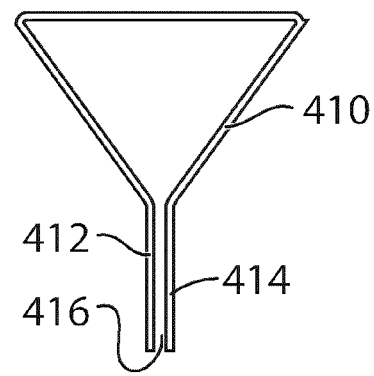
FIG.4a  FIG.4b
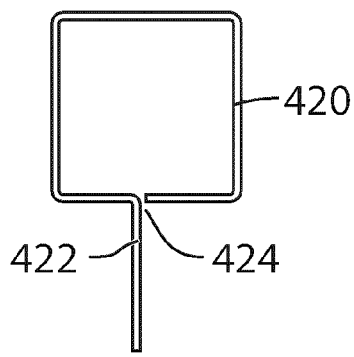
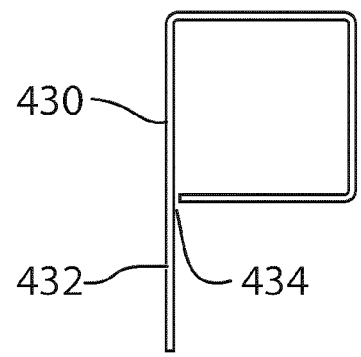
FIG.4c  FIG.4d

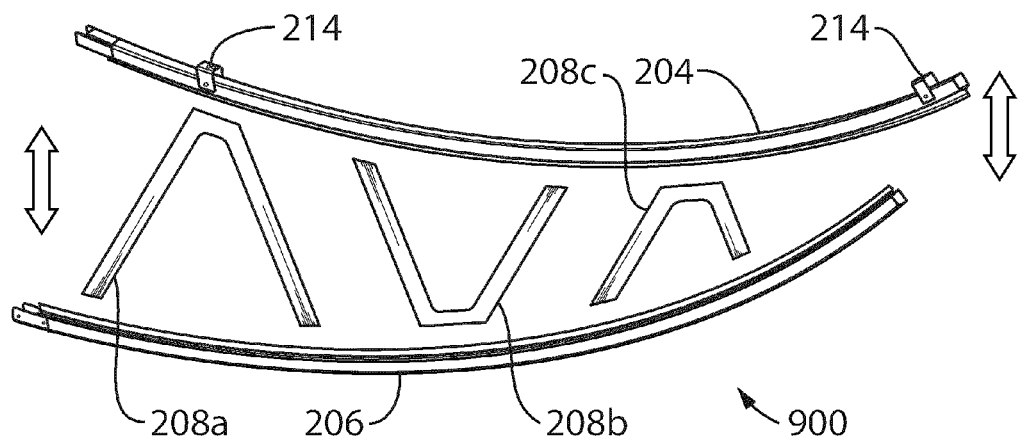
FIG.9
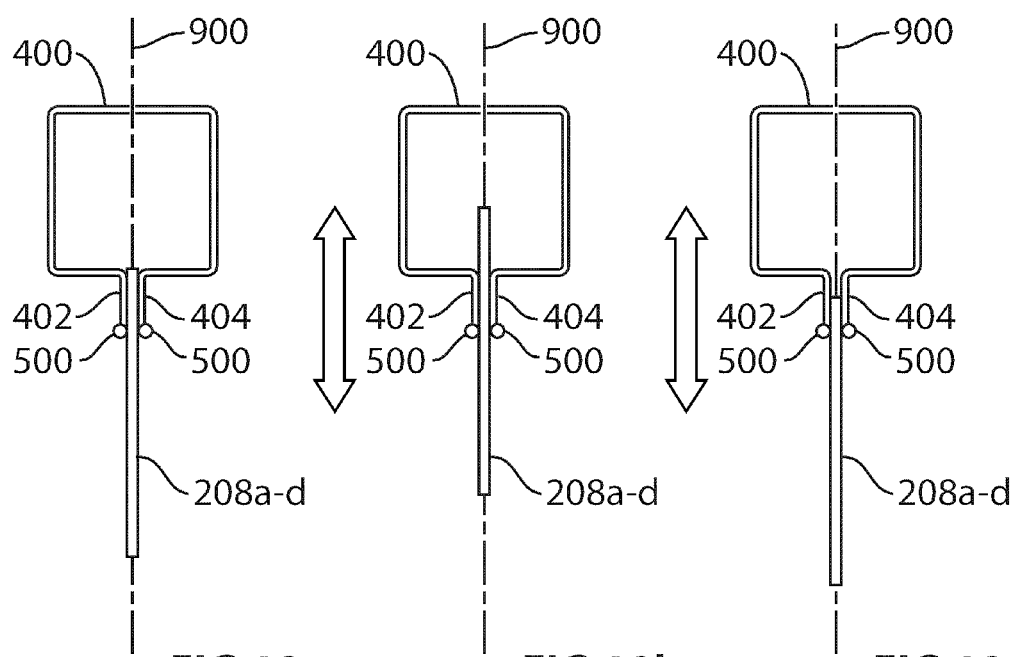
FIG.10a  FIG.10b  FIG.10c

SUPPORT SYSTEM AND METHOD FOR TROUGH-SHAPED SOLAR ENERGY CONCENTRATIONS

CROSS-REFERENCE TO RELATED APPLICATIONS

This U.S. National Stage Patent Application claims the benefit of International Application serial number PCT/CA2011/001232 filed Nov. 3, 2011, U.S. Provisional Patent Application Ser. No. 61/410,159 filed Nov. 4, 2010 and U.S. Provisional Patent Application Ser. No. 61/430,681 filed Jan. 7, 2011, the entire disclosures of the applications being considered part of the disclosure of this application, and hereby incorporated by reference.

FIELD OF THE INVENTION

The instant invention relates generally to solar energy collectors, and more particularly to a support system and method for trough-shaped solar energy concentrators.

BACKGROUND OF THE INVENTION

Concentrating Solar Power (CSP) systems utilize mirrors to concentrate the sun's energy onto points or lines. For instance, trough-shaped solar concentrators focus the sun's energy onto a fluid filed tube; the hot fluid is then transferred to a more conventional steam turbine power plant or similar system to generate electricity. One specific and non-limiting example utilizes a trough that is parabolic in a cross section taken in a plane that is normal to the length of the trough. With the assistance of a tracking system, parabolic trough collectors are very efficient as they follow the movement of the sun during the course of a day. For simplicity, the following discussion refers to parabolic troughs and parabolic mirrors. Of course, other suitable shapes are known.

As solar energy collector apparatuses incorporating parabolic type collectors are now being required to satisfy ever-larger energy requirements, they necessarily become physically larger. In some apparatuses, the aggregate collector surface may typically approach thousands of square meters. Consequently, reliable support for the large parabolic mirrors is critical to ensure excellent performance (focus) in varying atmospheric conditions and to guard against mirror breakage. Some of the key issues include overall frame deflection from its own weight, and that of the attached mirrors and wind loads. Prior art frames for solar trough designs relied on steel fabrications and weldments or aluminum extrusions configured and joined using techniques developed in the building construction industry. Such techniques require pre-assembly and transportation of large frame sections, often to locations that are difficult to access, or they require labor intensive assembly of components on-site, often under unfavorable conditions.

U.S. Pat. No. 4,423,719 discloses a parabolic trough solar energy collector that is fabricated without the need for any blind fasteners or blind fastening devices. An integrated parabolic solar energy collector is provided which can be welded or fastened with spot welds, seam welds, rivets, bolts or the like.

U.S. Pat. No. 4,135,493 discloses a parabolic trough solar energy collector including an elongated support with a plurality of ribs secured thereto and extending outwardly therefrom. One surface of the ribs is shaped to define a parabola and is adapted to receive and support a thin reflecting sheet, which forms a parabolic trough-shaped reflecting surface. One or more of the collectors is adapted to be joined end-to-end, and supported for joint rotation to track the sun.

U.S. Patent Application Publication No. 2010/0050560 discloses a parabolic trough solar energy collector frame including a plurality of chords. The frame comprises a plurality of extruded profiles, including chord sleeves, struts and strut end pieces, each chord sleeve having at least one chord sleeve fin, each chord sleeve positioned about one of the chords. The frame comprises a plurality of struts, at least one of the struts having a strut end piece having at least one strut end piece fin that connects with a chord sleeve fin to connect the plurality of chords. The frame comprises a platform supported by the chords and struts, on which the solar mirrors are disposed.

PCT Publication WO 2010/078004 discloses a solar energy collector apparatus comprising a solar collector panel having a parabolic shape, and a base comprising a pair of spaced apart support frames. Each support frame has a parabolic shape, which corresponds to the parabolic shape of the solar collector panel. Spaced apart rollers may be positioned along an upper surface of each support frame to support the solar collector panel. A drive mechanism may be coupled to the solar collector panel for rotation thereof. The solar collector panel may include a pair of spaced apart rollers to ensure that the solar collector panel rotates squarely with respect to the base.

Unfortunately, even in view of the systems that have been discussed in the preceding paragraphs, there still exists a need for a simplified support system and method for use with trough-shaped solar energy concentrators. It would therefore be advantageous to provide a system and a method that overcomes at least some of the limitations of the prior art.

SUMMARY OF EMBODIMENTS OF THE INVENTION

According to an aspect of at least one embodiment of the instant invention, there is provided a support arm for a trough-shaped solar collector assembly, comprising: a first rail having a length that extends between first and second opposite ends thereof and having a curvature extending along the length and defining a convex side of the first rail, the convex side forming a first open channel-structure that extends between the first end and the second end of the first rail; a second rail having a length that extends between first and second opposite ends thereof and having a curvature extending along the length and defining a concave side of the second rail, the concave side forming a second open channel-structure that extends between the first end and the second end of the second rail; and, a plurality of web structures interconnecting the first rail and the second rail, the plurality of web structures including a first web structure having a size that is defined along a spacing direction between opposite edges thereof and that is larger than a size that is defined along the spacing direction between opposite edges of a second web structure of the plurality of web structures, wherein one of the opposite edges of the first web structure and one of the opposite edges of the second web structure is received within the first open channel-structure of the first rail, and the other of the opposite edges of the first web structure and the other of the opposite edges of the second web structure is received within the second open channel-structure of the second rail, the first web structure disposed proximate the first ends of the first and second rails and the second web structure disposed proximate the second ends of the first and second rails, such that the second ends of the first and second rails are spaced more closely together than the first ends of the first and second rails when the support arm is in an assembled condition.

According to an aspect of at least one embodiment of the instant invention, there is provided a support arm for a trough-shaped solar collector assembly, comprising: a first rail that is curved in a direction along a length thereof and having a concave side for supporting a solar collector element and having a convex side that is opposite the concave side, a first flange protruding from the convex side of the first rail and extending along the length thereof; a second rail that is curved in a direction along a length thereof and having a concave side, a second flange protruding from the concave side of the second rail and extending along the length thereof, the second rail disposed in a spaced-apart relationship with the first rail such that the first and second flanges are approximately aligned one with the other and extend one toward the other; and, a plurality of web structures interconnecting the first rail and the second rail, the plurality of web structures including a first web structure having a size that is defined along a spacing direction between opposite edges thereof and that is larger than a size that is defined along the spacing direction between opposite edges of a second web structure of the plurality of web structures, wherein one of the opposite edges of the first web structure and one of the opposite edges of the second web structure is fixedly secured to the first flange of the first rail, and the other of the opposite edges of the first web structure and the other of the opposite edges of the second web structure is fixedly secured to the second flange of the second rail, the first web structure disposed proximate the first ends of the first and second rails and the second web structure disposed proximate the second ends of the first and second rails, such that the second ends of the first and second rails are spaced more closely together than the first ends of the first and second rails when the support arm is in an assembled condition According to an aspect of at least one embodiment of the instant invention, there is provided a support system for a trough-shaped solar collector assembly, comprising: a plurality of support arms, each support arm comprising: a first rail that is curved in a direction along a length thereof and having a concave side for supporting a solar collector element and having a convex side that is opposite the concave side, the convex side of the first rail forming a first web-engaging structure; a second rail that is curved in a direction along a length thereof and having a concave side forming a second web-engaging structure, the second rail disposed in a spaced-apart relationship with the first rail such that the first web-engaging structure faces the second web-engaging structure; and, a plurality of web structures fixedly secured to the first and second rails via the first web-engaging structure and the second web-engaging structure, respectively, including a first web structure disposed proximate the first ends of the first and second rails and creating a first spacing therebetween, and a second web structure disposed proximate the second ends of the first and second rails and creating a second spacing therebetween, the second spacing smaller than the first spacing; structure-attachment brackets mounted one each to the first ends of the first and second rails for attaching the support arm to a structure; and, a plurality of mirror-attachment brackets mounted to the concave side of the first rail, for securing the trough-shaped solar collector assembly to the support arm.

According to an aspect of at least one embodiment of the instant invention, there is provided a method for supporting a trough-shaped solar collector assembly, comprising: for each support arm of a plurality of support arms: aligning first edge portions of each one of a plurality of web structures with a first web engaging structure extending along a first side of a first rail, the first rail being curved in a direction along a length thereof and the first side being convexly curved along the length; aligning second edge portions that are opposite the first edge portions of each one of the plurality of web structures with a second web engaging structure extending along a first side of a second rail, the second rail being curved in a direction along a length thereof and the first side being concavely curved along the length; fixedly securing the first edge portions of each one of the plurality of web structures to the first web engaging structure and fixedly securing the second edge portions of each one of the plurality of web structures to the second web engaging structure, so as to rigidly interconnect the first and second rails and so that an inter-rail spacing increases between a first end of the support arm and a second end of the support arm, the second end opposite the first end; attaching the first end of each one of the plurality of support arms to a support structure via a pair of structure attachment brackets mounted one each to the first rail and to the second rail at the first end of each one of the plurality of support arms; and, attaching the trough-shaped solar collector assembly to the plurality of support arms via attachment brackets mounted adjacent to a second side of the first rail that is opposite the first side of the first rail.

According to an aspect of at least one embodiment of the instant invention, there is provided a method for supporting a trough-shaped solar collector assembly, the trough-shaped solar collector assembly extending along a length and having a collector element array that extends outwardly a known distance in both directions from a center-line thereof and that defines a known curvature in a direction transverse to the length, comprising: forming a plurality of first rails each having a first length that is selected in dependence upon the known distance, each first rail having a first web-engaging structure defined along one side thereof; forming a plurality of second rails each having a second length that is selected in dependence upon the known distance, each second rail having a second web-engaging structure defined along one side thereof; sweeping each one of the plurality of first rails to provide a curvature extending along the first length, the curvature selected in dependence upon the known curvature of the collector element array, such that the first web-engaging structure is defined along a side of the curved first rail that is convex in a direction along the first length; sweeping each one of the plurality of second rails to provide a curvature extending along the second length, the curvature selected in dependence upon the known curvature of the collector element array, such that the web-engaging structure is defined along a side of the curved second rail that is concave in a direction along the second length; forming a plurality of web-structures for being disposed between a curved first rail and a curved second rail, the plurality of web-structures being sized such that when the curved first rail and the curved second rail are interconnected by the plurality of web structures, second ends of the curved first and second rails are spaced more closely together than first ends of the curved first and second rails; attaching each interconnected pair of curved first and second rails via the first ends thereof to a central support structure that is aligned with the center-line of the trough-shaped solar collector assembly; and, attaching the collector element array to the interconnected pairs of curved first and second rails via attachment brackets carried by the curved first rails.

According to an aspect of at least one embodiment of the instant invention, there is provided a method for supporting a trough-shaped solar collector assembly, comprising: providing a first rail having a first length, the first rail curved in a direction along the first length and having a first flange protruding from a side thereof that is curved convexly in a direction along the first length; providing a second rail having a second length, the second rail curved in a direction along the second length and having a second flange protruding from a side thereof that is curved concavely in a direction along the second length; supporting the first rail relative to the second rail such that the first and second flanges are approximately aligned one with the other and extend one toward the other; overlapping a first edge portion of a web structure with the first flange and overlapping a second edge portion of the web structure with the second flange, the first and second edge portions spaced-apart one from the other along a spacing direction; adjusting at least one of an extent of overlap between the first edge portion and the first flange and an extent of overlap between the second edge portion and the second flange, so as to define a first arrangement of the first and second rails and the web structure; and, fixedly securing the first edge portion of the web structure to the first rail via the first flange and fixedly securing the second edge portion of the web structure to the second rail via the second flange while maintaining the defined first arrangement thereof.

According to an aspect of at least one embodiment of the instant invention, there is provided afield-adjustable support system for a trough-shaped solar collector assembly, comprising: first and second continuously curved rails for being disposed in a spaced-apart arrangement one relative to the other, each rail having a length extending between first and second opposite ends thereof; a web structure for being disposed between and for interconnecting the first and second continuously curved rails, the web structure configured for making at least three points of attachment to the first and second continuously curved rails including at least one point of attachment to the first continuously curved rail and one point of attachment to the second continuously curved rail; wherein prior to fixedly securing the web structure to the first and second continuously curved rails, at least one of the location and the orientation of the web structure is adjustable for supporting interconnection of the first and second continuously curved rails with different rates of convergence between a maximum inter-rail separation between the first ends of the first and second continuously curved rails and a minimum inter-rail separation between the second ends of the first and second continuously curved rails.

BRIEF DESCRIPTION OF THE DRAWINGS

Exemplary embodiments of the instant invention will now be described in conjunction with the following drawings, wherein like reference numerals refer to similar or identical parts throughout the several views, in which:

FIG. 4a shows a first cross-sectional profile of the first and second curved rails of the support arm of FIGS. 3a-d;

FIG. 4b shows a second cross-sectional profile of the first and second curved rails of the support arm of FIGS. 3a-d;

FIG. 4c shows a third cross-sectional profile of the first and second curved rails of the support arm of FIGS. 3a-d;

FIG. 4d shows a fourth cross-sectional profile of the first and second curved rails of the support arm of FIGS. 3a-d;

FIG. 9 is an exploded side view showing three web structures disposed within a common "slip plane" between the first and second rails of a support arm according to an embodiment of the instant invention, with "vertical" adjustability indicated;

FIGS. 10a-c shows an edge portion of a web structure fixedly secured between the flanges of one of the first and second rails of a support arm according to an embodiment of the instant invention, at three different respective vertical positions within the "slip plane";

DETAILED DESCRIPTION OF EMBODIMENTS OF THE INVENTION

Figure 1:
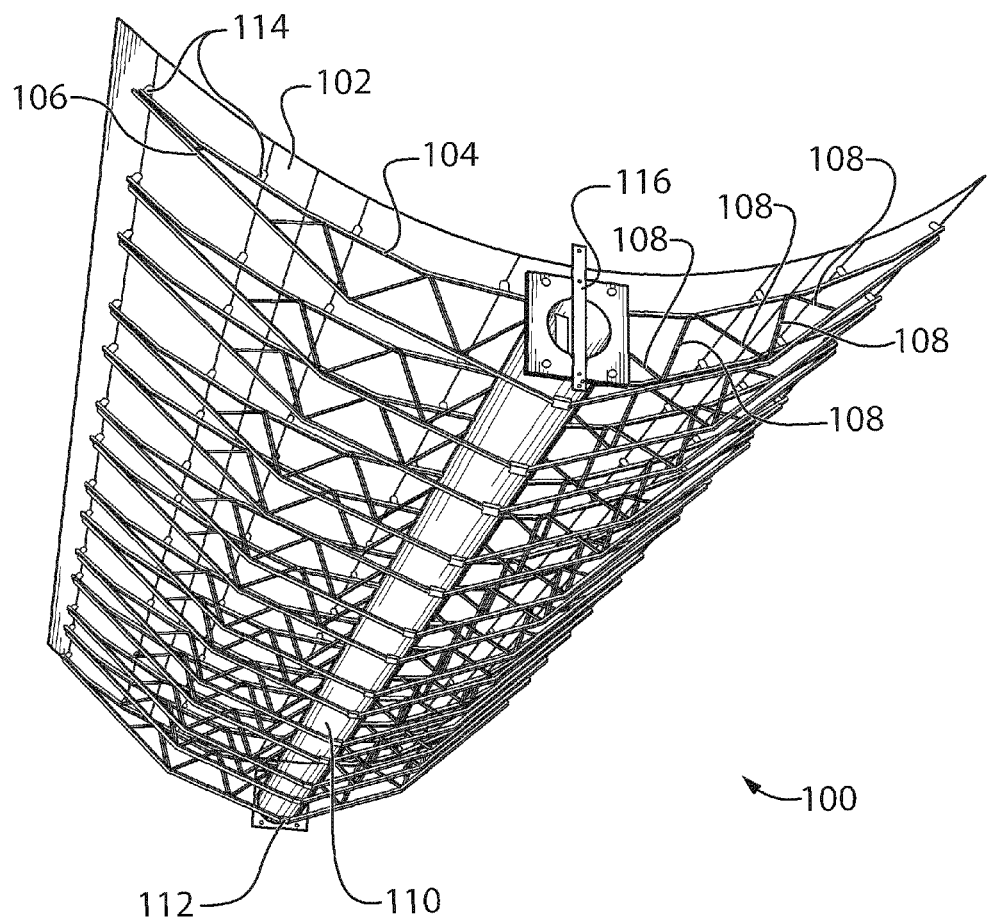
FIG. 1 is a perspective view showing a prior art support system for a trough-shaped solar concentrator assembly.

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein. The term "vertically" should be understood to mean a reference direction extending between the top and bottom of a drawing, and the term "longitudinally" should be understood to mean a reference direction extending between the left and right sides across a drawing.

In order to facilitate a better understanding of the features that are present in at least some of the embodiments of the instant invention, a prior art system is described herein below, with reference to FIG. 1. The prior art system 100 includes a parabolic trough-shaped solar collector assembly including a plurality of mirror elements 102. A plurality of support arms comprising an upper tube 104 and a lower tube 106, which are interconnected by a plurality of lacing elements 108, are connected via inner ends of the upper tubes 104 and of the lower tubes 106 to an elongated central support element-torque tube 110. In particular, the upper tube 104 is connected to torque tube 110 via a not illustrated upper structure-attachment bracket, and the lower tube 106 is connected to torque tube 110 via lower structure-attachment bracket 112. The mirror elements 102 are supported, one relative to another, in position above the support arms via mirror-attachment brackets 114, which are mounted to the upper tube 104 at predetermined locations along the length thereof. A torque plate 116 is provided at each of the opposite ends of the torque tube 110 for transferring rotational motion from a not illustrated drive mechanism to the torque tube 110, for rotating the parabolic trough-shaped solar collector assembly about a longitudinal axis extending along the length of the torque tube 110. In this fashion, the prior art parabolic trough-shaped solar collector tracks the movement of the sun across the sky.

In the system 100, the upper tubes 104, the lower tubes 106, and each of the lacing elements 108 are individually formed tubular structures. More particularly, the shape of the upper tubes 104 and of the lower tubes 106 are created either by bending sections of tubing that have been cut to length, or by welding together shorter tubular sections with angled ends so as to build the upper and lower tubes 104 and 106 with the desired shape. Further, each one of the individual lacing elements 108 must be cut to a specified length, to within very close tolerance, and must be positioned precisely during the process of assembling the supports arms. Very close tolerance and precise positioning of the lacing elements 108 is necessary, since each lacing element must be welded at one end to the upper tube 104 and at the other end to the lower tube 106. Even relatively small cutting errors or positioning errors can result in difficulty during the fixturing and assembly of the components of the support arms. Further, since a large number of individual tubular structures are welded together to form the support arms, the assembly of system 100 winds up being a very labor-intensive process.

When a trough-shaped solar collector is to be installed using the system 100 of FIG. 1, a plurality of the support arms must be preassembled and then transported to the installation site, or they must be assembled at the installation site often under adverse working conditions. In either case, the resulting support system 100 is excessively heavy and often provides unsatisfactory rigidity. In addition, the system 100 cannot be easily modified for supporting trough-shaped solar collectors of varying size and/or shape, since any such modification involves redesigning a large number of components in order to ensure that all of the components fit together sufficiently closely to allow for welding together to form the support arms.

Figure 2:
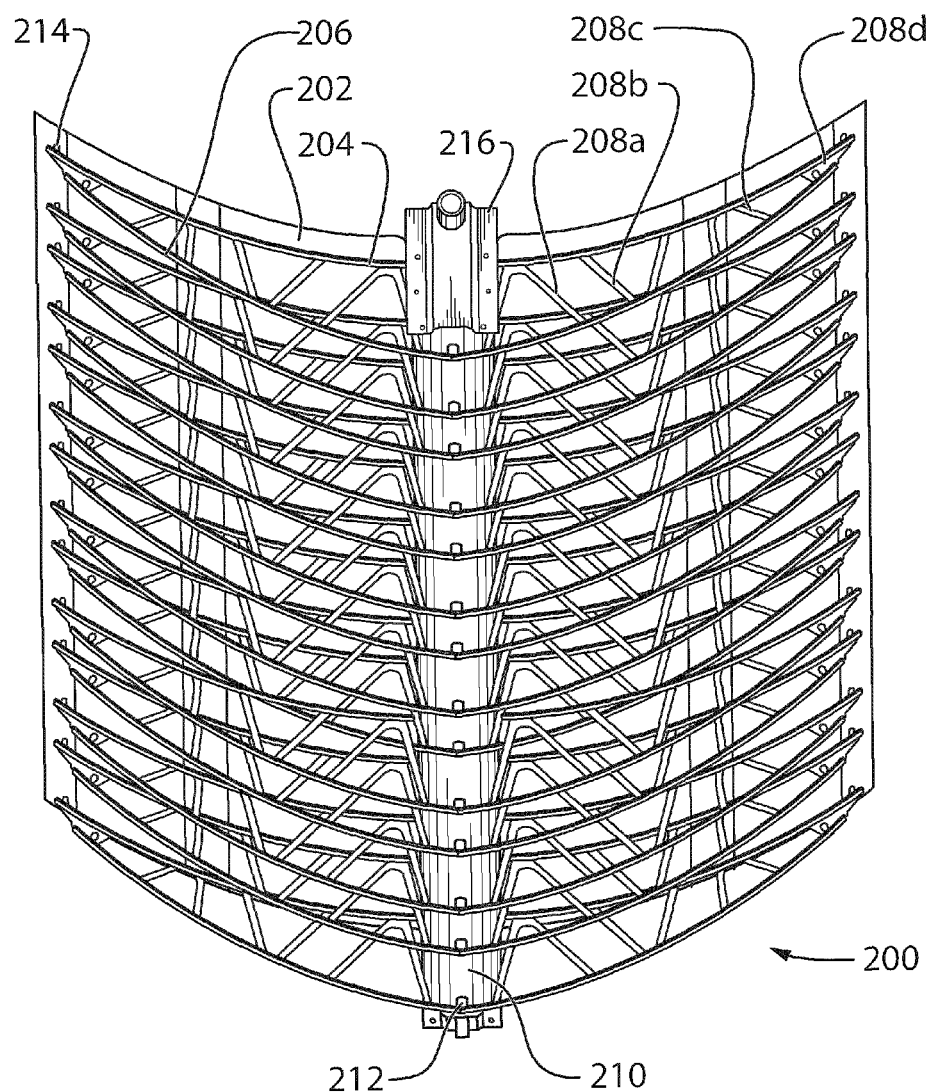
FIG. 2 is a perspective view showing a support system for a trough-shaped solar concentrator assembly comprising a plurality of support arms, according to an embodiment of the instant invention.

Referring now to FIG. 2, shown is a perspective view of a support system for supporting a trough-shaped solar concentrator assembly, according to an embodiment of the instant invention. The system 200 includes a parabolic trough-shaped solar collector assembly, including a plurality of mirror elements 202. A plurality of support arms, each comprising a first rail 204 and a second rail 206 interconnected by a plurality of web structures 208a-d, are coupled via inner ends of the first rails 204 and of the second rails 206 to an elongated central support element-torque tube 210. In particular, the first rail 204 is connected to torque tube 210 via a not illustrated upper structure attachment bracket, and the second rail 206 is connected to torque tube 210 via a lower structure attachment bracket 212. The mirror elements 202 are supported one-relative to another above the support arms via mirror attachment brackets 214, which are mounted to the first rail 204 at predetermined locations along the length thereof. A torque plate 216 is provided at each of the opposite ends of the torque tube 210 for transferring rotational motion from a not illustrated drive mechanism to the torque tube 210, for rotating the parabolic trough-shaped solar collector assembly about a longitudinal axis extending along the length of the torque tube 210. In this fashion, the supported trough-shaped solar concentrator assembly tracks the movement of the sun across the sky.

Figure 3A:
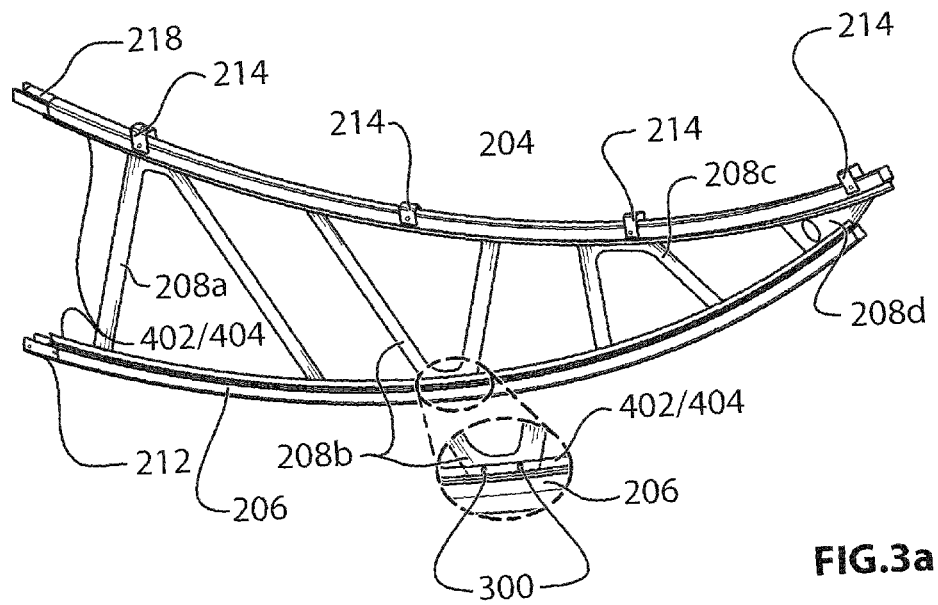
FIG. 3a is a side view of a support arm of the support system of FIG. 2.

Referring now to FIG. 3a, shown is a side view of a support arm of the support system that is shown in FIG. 2. By way of a specific and non-limiting example, each one of the first rail 204 and the second rail 206 in FIG. 3a has a cross-sectional profile of the type that is shown in greater detail in FIG. 4a. In particular, a pair of flanges protrudes from, and extends along the entire length of, the convexly curved side of the first rail 204 and the concavely curved side of the second rail 206. The pair of flanges, which includes a first flange 402 and a second flange 404, provides spaced-apart facing surfaces that define an open channel structure for receiving therebetween the edge portions of the plurality of web structures 208a-d. Additionally, the surfaces of the first flange 402 and of the second flange 404 facilitate attachment of the web structures 208a-d to the first rail 204 and to the second rail 206, such as for instance by spot-welding or by riveting. The enlarged section that is shown within the dashed-oval in FIG. 3a shows, in greater detail, a pair of rivets 300 securing the web structure 208b to the flanges 402/404 of the second rail 206.

Structure mounting brackets 212 and 218 are fixedly secured to the second rail 206 and to the first rail 204, respectively, such as by riveting or spot-welding. In addition, a plurality of mirror attachment brackets 214 are mounted at predetermined locations along the length of the first rail 204, such as by riveting or spot welding. In the specific example that is shown in FIG. 3a, a total of four mirror attachment brackets 214 are shown. Optionally, a number of mirror attachment brackets 214 greater than or less than four is provided, in dependence upon the length of the first rail 204, the size of the trough-shaped solar collector being supported, etc.

Referring still to FIG. 3a, each one of the plurality of web structures 208a-d is shaped and sized differently than the other ones of the plurality of web structures 208a-d. The particular shape and size of each of the plurality of web structures 208a-d is determined based on the requirements of a particular application. In general terms, the web structure 208a is larger in a spacing direction than the web structure 208b, which is larger in the spacing direction than the web structure 208c, which is larger in the spacing direction than the web structure 208d. When in the assembled condition, first ends of the first and second rails 204 and 206, respectively, are spaced farther apart than second ends of the first and second rails 204 and 206, respectively.

According to at least one embodiment, the first and second rails 204 and 206, respectively, and the plurality of web structures 208a-d are fabricated from the same material, such as for instance high-strength steel. In this case, the plurality of web structures 208a-d is attached to the first and second rails 204 and 206, respectively, by one of welding, riveting or another suitable coupling mechanism.

According to at least one embodiment, the first and second rails 204 and 206, respectively, and the plurality of web structures 208a-d are fabricated from different materials. For instance, the first and second rails 204 and 206, respectively, are fabricated from high-strength steel and the plurality of web structures 208a-d is fabricated from aluminum or an alloy thereof, or from a composite material, etc. Some examples of composite materials include steel/plastic/steel sandwich materials or steel/paper/steel sandwich materials. Depending on the specific combination of materials that is used, the plurality of web structures 208a-d is attached to the first and second rails 204 and 206, respectively, using a suitable one of welding, riveting or another suitable coupling mechanism.

Figure 3B:
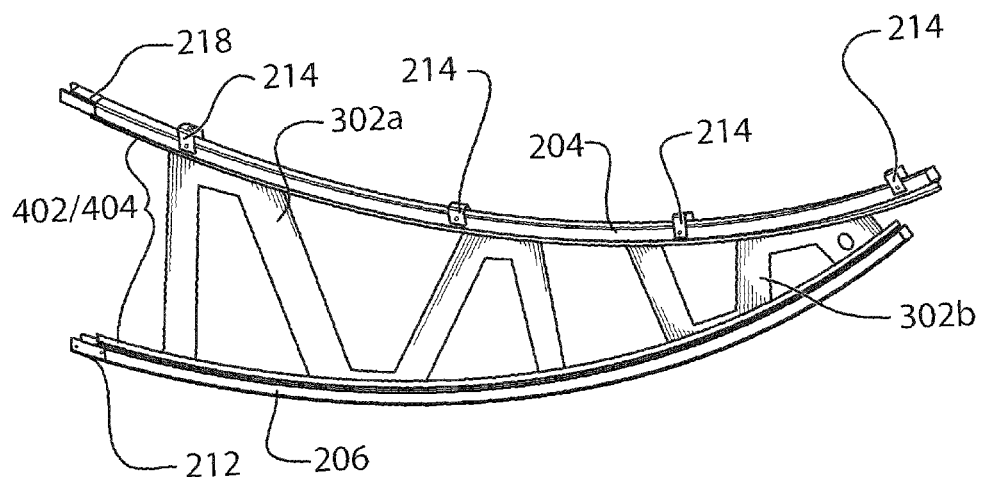
FIG. 3b is a side view of a support arm showing a first variation of the web structure design.

FIG. 3b shows a side view of a support arm showing a first variation of the web structure design. In particular, the "V" shaped web structures 208a-c and the end web structure 208d of FIG. 3a are replaced by an extended "M" shaped web structure 302a and an extended "N" shaped web structure 302b. Attachment of the web structures 302a and 302b to the first and second rails 204 and 206, respectively, is accomplished as described above.

Figure 3C:
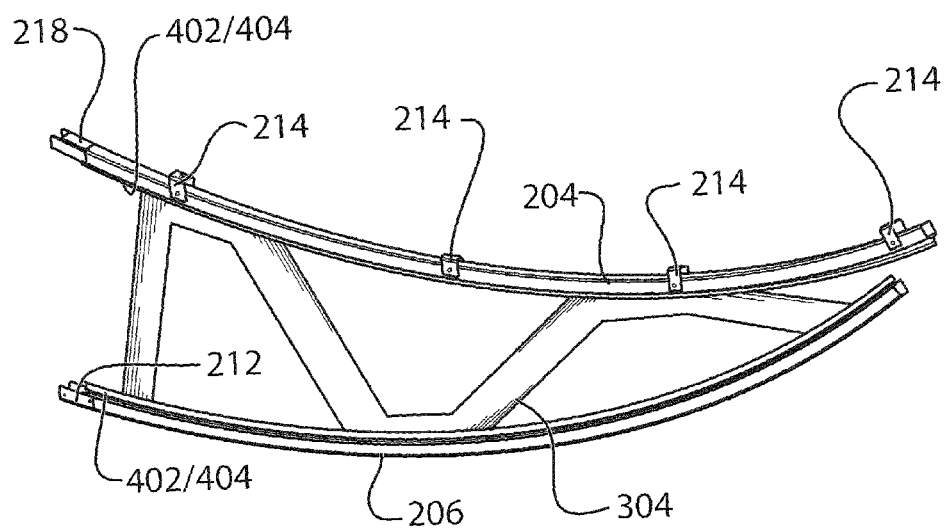
FIG. 3c is a side view of a support arm showing a second variation of the web structure design.

FIG. 3c shows a side view of a support arm showing a second variation of the web structure design. In particular, the "V" shaped web structures 208a-c and the end web structure 208d of FIG. 3a are replaced by a single extended "M" shaped web structure 304. Attachment of the web structure 304 to the first and second rails 204 and 206, respectively, is accomplished as described above.

Figure 3D:
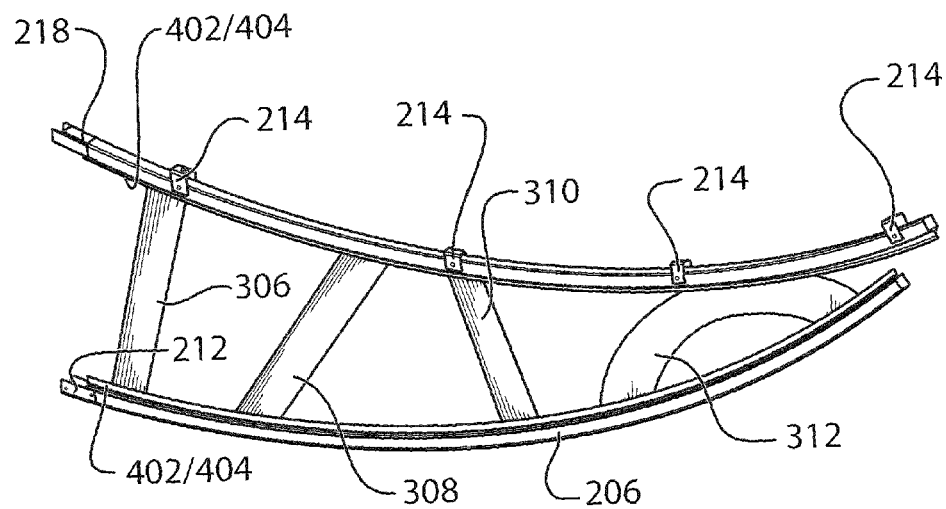
FIG. 3d is a side view of a support arm showing a third variation of the web structure design.

FIG. 3d shows a side view of a support arm showing a third variation of the web structure design. In particular, the "V" shaped web structures 208a-c and the end web structure 208d of FIG. 3a are replaced by a plurality of straight-section web structures 306, 308 and 310 and a generally arc-shaped web structure 312. Attachment of the web structures 306, 308, 310 and 312 to the first and second rails 204 and 206, respectively, is accomplished as described above.

FIG. 4a shows a first cross-sectional profile of the curved first and second rails, 204 and 206, respectively, of the support arm of FIGS. 3a-d. In particular, the profile includes a substantially rectangular portion 400 with two flanges 402 and 404 extending away from one side thereof. The two flanges 402 and 404 define an open channel structure 406 therebetween for receiving edge portions of the web structures 208a-d. In addition, the flanges 402 and 404 provide surfaces for fixedly securing the edge portions of the web structures 208a-d, such as by spot welding as shown in FIG. 5a or by riveting as shown in FIG. 5b. By way of a specific and non-limiting example, the first rails 204 and the second rails 206 are roll formed to produce non-curved rails having the profile shown in FIG. 4a. After roll forming the profile, curvature is added to the non-curved rails in a sweep box, such that the flanges 402 and 404 are arranged along a resulting convexly curved side of the first rails 204 and along a resulting concavely curved side of the second rails 206. The dimensions indicated in FIG. 4a are provided by way of a specific and non-limiting example. In practice, the actual dimensions of the rail profile are selected based on the specific requirements of a particular application. Optionally, the edge portions of one or more of the web structures that are shown in FIGS. 3b-c are received between the two flanges 402 and 404 in place of the web structures 208a-d.

FIG. 4b shows a second cross-sectional profile of the first and second curved rails of the support arm of FIGS. 3a-d. In particular, the profile includes a substantially triangular portion 410 with two flanges 412 and 414 extending away from one apex thereof. The two flanges 412 and 414 define an open channel structure 416 therebetween for receiving edge portions of the web structures 208a-d.

FIG. 4c shows a third cross-sectional profile of the first and second curved rails of the support arm of FIGS. 3a-d. In particular, the profile includes a substantially rectangular portion 420 with a single flange 422 extending away from a central portion of one side thereof. A small gap 424 adjacent to the flange 422 may be welded for added rigidity after the profile is formed. The flange 422 provides a surface for fixedly securing the edge portions of the web structures 208a-d, such as by spot welding or by riveting, etc. Optionally, one or more of the web structures that are shown in FIGS. 3b-c are fixedly secured to the flange 422 in place of the web structures 208a-d.

FIG. 4d shows a fourth cross-sectional profile of the first and second curved rails of the support arm of FIGS. 3a-d. In particular, the profile includes a substantially rectangular portion 430 with a single flange 432 extending away from an edge portion of one side thereof. A small gap 434 adjacent to the flange 432 may be welded for added rigidity after the profile is formed. The flange 432 provides a surface for fixedly securing the edge portions of the web structures 208a-d, such as by spot welding or by riveting, etc. Optionally, one or more of the web structures that are shown in FIGS. 3b-c are fixedly secured to the flange 422 in place of the web structures 208a-d.

Figure 4E:
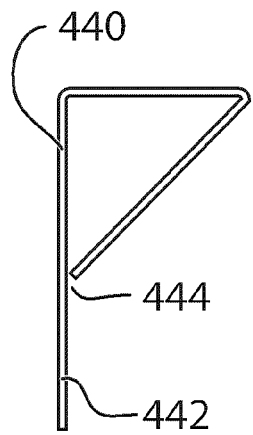
FIG. 4e shows a fifth cross-sectional profile of the first and second curved rails of the support arm of FIGS. 3a-d.
Figure 5A:
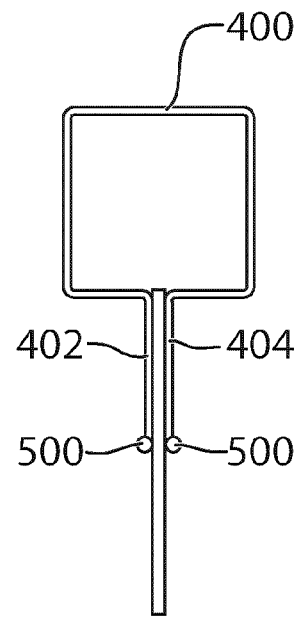
FIG. 5a shows an edge portion of a web structure received within an open channel structure that is formed along the convex side of the first rail of the support arm of FIGS. 3a-d, the edge of the web structure spot welded to flanges protruding from the convex side.
Figure 5B:
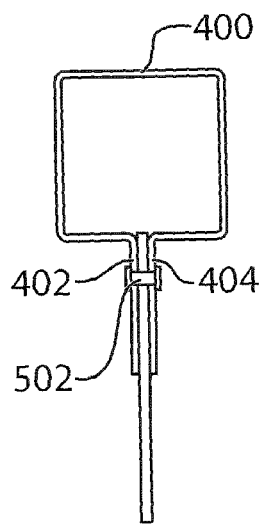
FIG. 5b shows an edge portion of a web structure received within an open channel structure that is formed along the convex side of the first rail of the support arm of FIGS. 3a-d, the edge of the web structure riveted to flanges protruding from the convex side.

FIG. 4e shows a fifth cross-sectional profile of the first and second curved rails of the support arm of FIGS. 3a-d. In particular, the profile includes a substantially right-triangular portion 440 with a single flange 442 extending away from an apex thereof. A small gap 444 adjacent to the flange 442 may be welded for added rigidity after the profile is formed. The flange 442 provides a surface for fixedly securing the edge portions of the web structures 208a-d, such as by spot welding or by riveting, etc. Optionally, one or more of the web structures that are shown in FIGS. 3b-c are fixedly secured to the flange 422 in place of the web structures 208a-d.

Figure 4F:
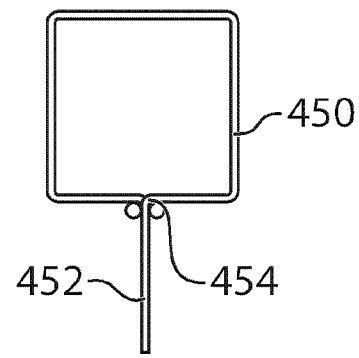
FIG. 4f shows a sixth cross-sectional profile of the first and second curved rails of the support arm of FIGS. 3a-d.

FIG. 4f shows a sixth cross-sectional profile of the first and second curved rails of the support arm of FIGS. 3a-d. In particular, the profile includes a substantially square or rectangular closed portion 450. The closed portion 450 optionally is roll formed and closed with a seam weld, or is extruded or hydroformed. A single flange 452 is fixedly secured to one side of the closed portion 450 and projects away therefrom at substantially a right angle. As is shown at 454 in FIG. 4f, the flange 452 is welded to the one side of the closed portion 450. The single flange extends along the length of the curved rail and provides a surface for fixedly securing the edge portions of the web structures 208a-d, such as by spot welding or by riveting, etc. Optionally, one or more of the web structures that are shown in FIGS. 3b-c are fixedly secured to the flange 422 in place of the web structures 208a-d.

Figure 4G:
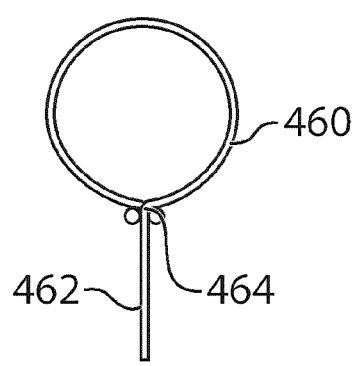
FIG. 4g shows a seventh cross-sectional profile of the first and second curved rails of the support arm of FIGS. 3a-d.

FIG. 4g shows a fifth cross-sectional profile of the first and second curved rails of the support arm of FIGS. 3a-d. In particular, the profile includes a substantially circular closed portion 460. The closed portion 460 optionally is roll formed and closed with a seam weld, or is extruded or hydroformed. A single flange 462 is fixedly secured to the closed portion 460 and projects away therefrom at substantially a right angle. As is shown at 464 in FIG. 4g, the flange 462 is welded to the one side of the closed portion 460. The single flange extends along the length of the curved rail and provides a surface for fixedly securing the edge portions of the web structures 208a-d, such as by spot welding or by riveting, etc. Optionally, one or more of the web structures that are shown in FIGS. 3b-c are fixedly secured to the flange 422 in place of the web structures 208a-d.

FIG. 5a shows an end view in which an edge portion of a web structure 208a-d is received within an open channel structure that is formed along the convex side of the first rail 204 of the support arm of FIGS. 3a-d. Spot welds 500 fixedly secure the edge of the web structures 208a-d to surfaces of the flanges 402 and 404, which flanges protrude from the convex side of the first rail 204. Optionally, one or more of the web structures that are shown in FIGS. 3b-c are fixedly secured to the flanges 402 and 404 in place of the web structures 208a-d.

FIG. 5b shows an end view in which an edge portion of a web structure 208a-d is received within an open channel structure that is formed along the convex side of the first rail 204 of the support arm of FIGS. 3a-d. A rivet 502 fixedly secure the edge of the web structures 208a-d to surfaces of the flanges 402 and 404, which flanges protrude from the convex side of the first rail 204. Optionally, one or more of the web structures that are shown in FIGS. 3b-c are fixedly secured to the flanges 402 and 404 in place of the web structures 208a-d.

Figure 6:
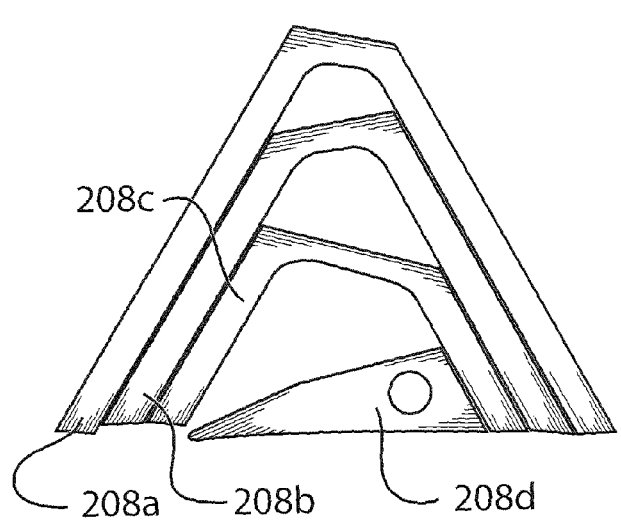
FIG. 6 shows a plurality of web structures nested together after being stamped from a single blank.

FIG. 6 shows a plurality of web structures, in this specific example web structures 208a-d, nested together after being stamped from a single blank. By way of a specific and non-limiting example, steel rule dies are used to stamp out the plurality of web structures 208a-d in a single press. Of course, different web structure shapes may be stamped in a similar fashion.

Figure 7:
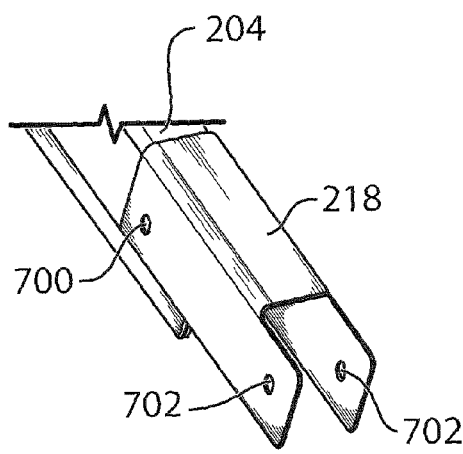
FIG. 7 shows a structure-attachment bracket mounted to the first end of the first curved rail of the support arm of FIGS. 3a-d.

FIG. 7 shows enlarged detail of a structure attachment bracket 218, which is mounted to the first end of the first curved rail 204 of the support arm of FIGS. 3a-d. In the instant example, the structure attachment bracket 218 is secured to the first curved rail 204 using a pair of rivets 700, one of which is not illustrated in FIG. 7. The structure attachment bracket 218 includes through-holes 702 for receiving a mechanical fastener when the support arm is mounted to a support structure, such as for instance torque tube 210 of FIG. 2. By way of a specific and non-limiting example, the structure attachment bracket 218 is fabricated from steel.

Figure 8:
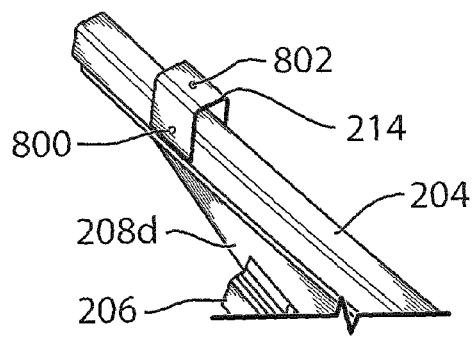
FIG. 8 shows a mirror-attachment bracket mounted proximate to the second end of the first curved rail of the support arm of FIGS. 3a-d.

FIG. 8 shows a mirror attachment bracket mounted proximate to the second end of the first curved rail of the support arm of FIGS. 3a-d. In the instant example, the mirror attachment bracket 214 is secured to the first curved rail 204 using a pair of rivets 800, one of which is not illustrated in FIG. 8. The mirror attachment bracket 214 includes a through-hole 802 for receiving a mechanical fastener when the trough-shaped solar collector is mounted thereto. By way of a specific and non-limiting example, the structure attachment bracket 214 is fabricated from steel.

The first rail 204, the second rail 206, the web structures such as 208a-d, the structure-attachment brackets 212 and 218 and the mirror-attachment brackets 214 may be fixtured to facilitate assembly. The system 200 that is illustrated in FIG. 2 is then assembled by attaching a plurality of support arms along both sides of the torque tube 210, via the structure-attachment brackets 212 and 218. The system 200 provides the same stiffness as the system 100 but with reduced weight, or alternatively the system 200 provides improved stiffness relative to the system 100 with the same weight. Of course, increased stiffness results in reduced deflection such that the structure is deformed to a lesser extent under the influence of gravity as the system tracks the sun during the course of the day, or when the system is subjected to high wind loads. Reduced deflection results in improved optical characteristics and accordingly higher efficiency.

The system of FIG. 2 is more modular and more customizable than the prior art system of FIG. 1. For instance, a system for supporting larger trough-shaped collector systems may be fabricated simply by roll-forming longer first and second rails 204 and 206, respectively, and by stamping a plurality of web structures that provide a support arm with desired inter-rail spacing between an inner end that is attached to a central torque tube, or to another suitable support structure, and an outer end that is opposite the inner end. Optionally, two or more rail portions are joined together in an end-to-end fashion to form a first rail and two or more rail portions are joined together in an end-to-end fashion to form a second rail. In this way, the same tool may be used to roll-form rails that are nearly two times the length of the first and second rails 204 and 206, respectively, of the system 200.

Figure 11:
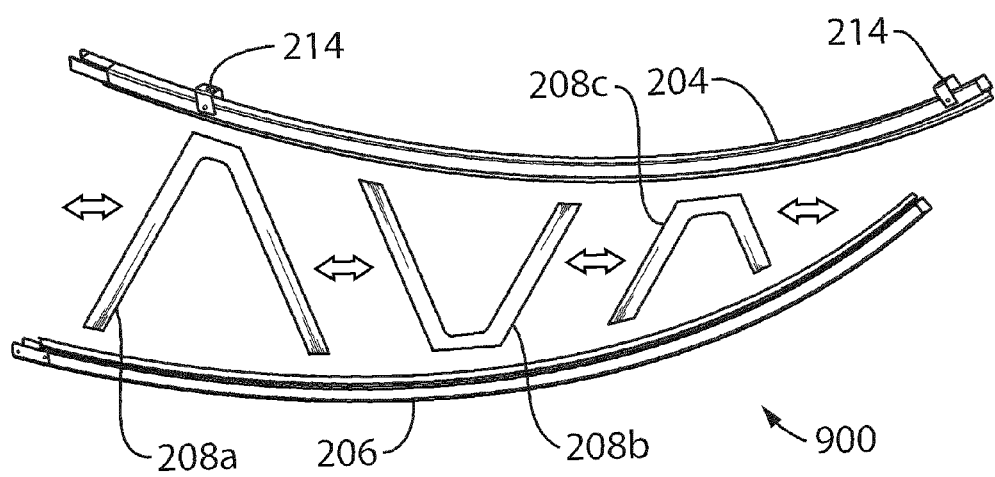
FIG. 11 is an exploded side view showing three web structures disposed within a common "slip plane" between first and second rails of a support arm according to an embodiment of the instant invention, with "longitudinal" adjustability indicated.

FIGS. 9, 10a-c and 11 illustrate the different degrees of adjustability that are present in the system of FIG. 2. As discussed above, the flanges (e.g. 402 and 404) protruding from the convex and concave sides of the first and second rails 204 and 206, respectively, provide surfaces for attaching the web structures to the rails. For instance, the edges of the web structures are overlapped with the flanges of the first and second rails, and are fixedly secured thereto by riveting, by welding, by toggle locking or by another suitable method. As is shown in FIGS. 9, 10a-c and 11 each of the web structures (for clarity, only the web structures 208a-c are shown in FIGS. 9 and 11) are disposed within a common plane, referred to as a "slip plane" 900. Prior to fixedly securing the web structures to the flanges of the first and second rails, an extent of overlap between the edge portions of the web structures and the flanges, and/or the location of the web structures along the length of the rails, can be adjusted within predetermined limits by moving the web structures vertically (indicated by the double-headed arrows in FIG. 9) and/or longitudinally (indicted by the double-headed arrows in FIG. 11), within "slip plane" 900.

Adjusting the extent of the overlap between the edge portions of the web structures and the first and second flanges, and/or adjusting the location of the web structures along the length of the rails, provides sufficient flexibility to compensate for cutting errors in the manufacture of the web structures, or to allow for a relatively small amount of modification to the geometry of the support arm. For instance, it may be possible to modify a particular support arm design by roll forming first and second rails that are up to at least 10% longer than the design calls for, and still be able to successfully interconnect the first and second rails without making any modifications to the web structures. In particular, the web structures may be attached to the longer rails with an increased spacing between the web structures compared to the spacing that is provided in the particular design, such as by adjusting the web structures longitudinally within "slip plane" 900. Additionally, the height of the support arm may be varied by adjusting the web structures "vertically" within "slip plane" 900, as is shown in greater detail in FIGS. 10a-c. Each one of FIGS. 10a-c shows the edge portion of one of the web structures 208a-d fixedly secured to the flanges 402 and 404 via spot welds 500. In FIG. 10a, a support arm of intermediate height is formed in which the edge portions of the web structures 208a-d do not extend past the flanges 402 and 404 into the substantially rectangular portion 400 of the rail. In FIG. 10b, a support arm of lesser height relative to 10a is formed in which the edge portions of the web structures 208a-d extend past the flanges 402 and 404 and into the substantially rectangular portion 400 of the rail. In FIG. 10c, a support arm of greater height relative to 10a is formed in which the edge portions of the web structures 208a-d extend only partially into the opening that is formed between the flanges 402 and 404.

The web structures may also be adjusted rotationally, relative to the rails, as required in order to facilitate making three points of attachment to the first and second rails 204 and 206, including at least one point of attachment to the first rail 204 and at least one point of attachment to the second rail 206. The prior art system 100 does not support this type of modification, including field modifications even under adverse conditions, since each of the lacing elements 108 must be cut precisely to length in order to be welded to the upper and lower tubes 104 and 106, respectively. There is no adjustable overlap in the prior art system 100, since the ends of the lacing elements 108 are butted up against the surfaces of the upper and lower tubes 104 and 106, respectively, and welded thereto.

Additionally, since the web structures that are shown in FIGS. 3a-d may be secured to the flanges of the rails by riveting, instead of by welding, the use of different materials such as for instance steel for the rails and aluminum or composite materials for the web structures, is supported. The use of lightweight materials results in substantial weight reduction compared to the prior art system 100 of FIG. 1. Further, the use of flat web structures, such as the ones that are shown in FIGS. 3a-d, instead of the prior art tubular members results in additional weight reduction compared to the system 100 of FIG. 1. Alternatively, greater rigidity is achieved in the system 200 compared to the system 100 of the same weight.

Numerous other embodiments may be envisaged without departing from the scope of the instant invention.

What is claimed is:

1. A support arm for a trough-shaped solar collector assembly, comprising:
    a first rail having a length that extends between first and second opposite ends thereof and having a curvature extending along the length and defining a convex side of the first rail, the convex side forming a first open channel-structure that extends between the first end and the second end of the first rail;
    a second rail having a length that extends between first and second opposite ends thereof and having a curvature extending along the length and defining a concave side of the second rail, the concave side forming a second open channel-structure that extends between the first end and the second end of the second rail; and,
    a plurality of web structures interconnecting the first rail and the second rail, the plurality of web structures including a first web structure having a size that is defined along a spacing direction between opposite edges thereof and that is larger than a size that is defined along the spacing direction between opposite edges of a second web structure of the plurality of web structures,
    wherein one of the opposite edges of the first web structure and one of the opposite edges of the second web structure is received within the first open channel-structure of the first rail, and the other of the opposite edges of the first web structure and the other of the opposite edges of the second web structure is received within the second open channel-structure of the second rail, the first web structure disposed proximate the first ends of the first and second rails and the second web structure disposed proximate the second ends of the first and second rails, such that the second ends of the first and second rails are spaced more closely together than the first end of the first and second rails when the support arm is in an assembled condition, and
    wherein at least one of the first and second web structures is formed of one integral piece and is coupled to the first and second rails via at least three points of attachment including at least one point of attachment to one of the first and second rails and at least one point of attachment to the other one of the first and second rails.

2. A support arm according to claim 1, comprising first and second substantially parallel flanges protruding from the convex side of the first rail, and comprising third and fourth substantially parallel flanges protruding from the concave side of the second rail, the first and second flanges cooperatively defining the first open-channel structure and the third and fourth flanges cooperatively defining the second open-channel structure.

3. A support arm according to claim 2, wherein the one of the opposite edges of the first and second web structures are coupled to the first rail via at least a surface of the first and second flanges, and the other of the opposite edges of the first and second web structures are coupled to the second rail via at least a surface the third and fourth flanges.

4. A support arm according to claim 1, wherein each one of the first and second web structures is coupled to the first and second rails via at least three points of attachment including at least one point of attachment to one of the first and second rails and at least one point of attachment to the other one of the first and second rails.

5. A support arm according to claim 1, wherein the first and second web structures are fixedly secured to the first and second rails by at least one of welding, riveting and toggle-locking.

6. A support arm according to claim 1, wherein the first and second rails are fabricated from a first material and the plurality of web structures is fabricated from a second material.

7. A support arm according to claim 1, wherein the first and second rails are fabricated from steel and the plurality of web structures is fabricated from aluminum or an alloy thereof.

8. A support arm according to claim 1, wherein the first and second rails are fabricated from steel and the plurality of web structures is fabricated from a composite material.

9. A support arm according to claim 1, comprising a structure-mounting bracket coupled to the first end of each one of the first and second rails for attaching the support arm to a structural support member.

10. A support arm according to claim 1, comprising a plurality of collector-mounting brackets coupled to the first rail for attaching the trough-shaped solar collector assembly to the support arm.

11. A support arm for a trough-shaped solar collector assembly, comprising:
    a first rail that is curved in a direction along a length thereof and having a concave side for supporting a solar collector element and having a convex side that is opposite the concave side, a first flange protruding from the convex side of the first rail and extending along the length thereof;
    a second rail that is curved in a direction along a length thereof and having a concave side, a second flange protruding from the concave side of the second rail and extending along the length thereof, the second rail disposed in a spaced-apart relationship with the first rail such that the first and second flanges are approximately aligned one with the other and extend one toward the other; and,
    a plurality of web structures interconnecting the first rail and the second rail, the plurality of web structures including a first web structure having a size that is defined along a spacing direction between opposite edges thereof and that is larger than a size that is defined along the spacing direction between opposite edges of the second web structure of the plurality of web structures,
    wherein one of the opposite edges of the first web structure and one of the opposite edges of the second web structure is fixedly secured to the first flange of the first rail, and the other of the opposite edges of the first web structure and the other of the opposite edges of the second web structure is fixedly secured to the second flange of the second rail, the first web structure disposed proximate the first ends of the first and second rails and the second web structure disposed proximate the second ends of the first and second rails, such that the second ends of the first and second rails are spaced more closely together than the first ends of the first and second rails when the support arm is in an assembled condition, and wherein at least one of the plurality of web structures is formed of one integral piece and is coupled to the first and the first and second rails via at least three points of attachment including at least one point of attachment to one of the first and second rails and at least one point of attachment to the other one of the first and second rails.

12. A support arm according to claim 11, wherein the first and second web structures are fixedly secured to the first and second flanges by at least one of welding, riveting and toggle-locking.

13. A support arm according to claim 11, wherein the first flange is integrally formed with the first rail and the second flange is integrally formed with the second rail.

14. A support arm according to claim 11, wherein the first flange is fixedly secured along the length of the convex side of the first rail and the second flange is fixedly secured along the length of the concave side of the second rail.

15. A support are according to claim 14, wherein the first flange is welded to the convex side of the first rail and the second flange is welded to the concave side of the second rail.

16. A method for supporting a trough-shaped solar collector assembly, comprising:
for each support arm of a plurality of support arms:
aligning first edge portions of each one of a plurality of web structures with a first web engaging structure extending along a first side of a first rail, the first rail being curved in a direction along a length thereof and the first side being convexly curved along the length;
at least one of said web structures being formed as a single integral piece;
aligning second edge portions that are opposite the first edge portions of each one of the plurality of web structures with a second web engaging structure extending along a first side of a second rail, the second rail being curved in a direction along a length thereof and the first side being concavely curved along the length;
fixedly securing the first edge portions of each one of the plurality of web structures to the first web engaging structure and fixedly securing the second edge portions of each one of the plurality of web structures to the second web engaging structure, so as to rigidly interconnect said at least one of the web structure which is formed as a single integral piece to the first and second rails via at least three points of attachment and so that an inter-rail spacing increases between a first end of the support arm and a second end of the support arm, the second end opposite the first end;
attaching the first end of each one of the plurality of support arms to a support structure via a pair of structure attachment brackets mounted one each to the first rail and to the second rail at the first end of each one of the plurality of support arms; and,
attaching the trough-shaped solar collector assembly to the plurality of support arms via attachment brackets mounted adjacent to a second side of the first rail that is opposite the first side of the first rail.

17. A method according to claim 16, wherein fixedly securing comprises at least one of welding, riveting and toggle-locking.

18. A method for supporting a trough-shaped solar collector assembly, the trough-shaped solar collector assembly extending along a length and having a collector element array that extends outwardly a known distance in both directions from a center-line thereof and that defines a known curvature in a direction transverse to that length, comprising:
forming a plurality of first rails each having a first length that is selected in dependence upon the known distance, each first rail having a first web-engaging structure defined along one side thereof;
forming a plurality of second rails each having a second length that is selected in dependence upon the known distance, each second rail having a second web-engaging structure defined along one side thereof;
sweeping each one of the plurality of first rails to provide a curvature extending along a the first length, the curvature selected in dependence upon the known curvature of the collector element array, such that the first web-engaging structure is defined along a side of the curved first rail that is convex in a direction along the first length;
sweeping each one of the plurality of second rails to provide a curvature extending along the second length, the curvature selected in dependence upon the known curvature of the collector element array, such that the web-engaging structure is defined along a side of the curved second rail that is concave in a direction along the second length;
forming a plurality of web-structures each formed as a single piece for being disposed between a curved first rail and a curved second rail, the plurality of web-structures being sized such that when the curved first rail and the curved second rail are interconnected by the plurality of web structures via at three points of attachment with at least one point of attachment to one of the first and second rails and at least one point of attachment to the other of the first and second rails, second ends of the curved first and second rails are spaced more closely together than first ends of the curved first and second rails;
attaching each interconnected pair of curved first and second rails via the first ends thereof to a control support structure that is aligned with the center-line of the trough-shaped solar collector assembly; and,
attaching the collector element array to the interconnected pairs of curved first and second rails via attachment brackets carried by the curved first rails.

19. A method for supporting a trough-shaped solar collector assembly, comprising:
providing a first rail having a first length, the first rail curved in a direction along the first length and having a first flange protruding from a side thereof that is curved convexly in a direction along the first length;
providing a second rail having a second length, the second rail curved in a direction along the second length and having a second flange protruding from a side thereof that is curved concavely in a direction along the second length;
supporting the first rail relative to the second rail such that the first and second flanges are approximately aligned one with the other and extend one toward the other;
overlapping a first edge portion of a one piece web structure with the first flange and overlapping a second edge portion of the web structure with the second flange, the first and second edge portions spaced-apart one from the other along a spacing direction;
adjusting at least one of an extent of overlap between the first edge portion and the first flange and an extent of overlap between the second edge portion and the second flange, so as to define a first arrangement of the first and second rails and the web structure; and, fixedly securing the web structure to the first and second rails via at least three points of attachment including fixedly securing the first edge portion of the web structure to the first rail via the first flange and fixedly securing the second edge portion of the web structure to the second rail via the second flange while maintaining the defined first arrangement thereof.

* * * * *